(12) United States Patent
Abrahamsson et al.

(10) Patent No.: US 8,800,798 B2
(45) Date of Patent: Aug. 12, 2014

(54) PACKAGING WITH LID SEALABLE TO CONTAINER AND A METHOD OF SEALING THE PACKAGING

(75) Inventors: Bertil Abrahamsson, Mullsjö (SE); Torben Noer, Beder (DK)

(73) Assignee: Superfos A/S, Taastrup (DK)

( * ) Notice: Subject to any disclaimer, the term of this patent is extended or adjusted under 35 U.S.C. 154(b) by 1047 days.

(21) Appl. No.: 12/086,589

(22) PCT Filed: Dec. 21, 2006

(86) PCT No.: PCT/DK2006/000734
§ 371 (c)(1),
(2), (4) Date: Aug. 26, 2008

(87) PCT Pub. No.: WO2007/071252
PCT Pub. Date: Jun. 28, 2007

(65) Prior Publication Data
US 2009/0032532 A1 Feb. 5, 2009

(30) Foreign Application Priority Data
Dec. 22, 2005 (DK) .................................. 2005 01820

(51) Int. Cl.
*B65D 41/00* (2006.01)
(52) U.S. Cl.
USPC ..................................... 220/359.1; 220/359.4
(58) Field of Classification Search
USPC ............ 220/359.1–359.4, 254.7; 264/328.17, 264/328.18; 206/528, 532
See application file for complete search history.

(56) References Cited

U.S. PATENT DOCUMENTS 2,649,392 A 8/1953 Marshall
2,837,236 A 6/1958 Betner
(Continued)

FOREIGN PATENT DOCUMENTS

CA 1139713 1/1983
DE 4234513 4/1994
(Continued)

OTHER PUBLICATIONS

English Abstract of DE4234513.
(Continued)

*Primary Examiner* — Luan K Bui
*Assistant Examiner* — Rafael Ortiz
(74) *Attorney, Agent, or Firm* — Dykema Gossett PLLC

(57) ABSTRACT

The invention relates to a packaging, preferably for foodstuffs, said packaging comprising a container and a lid, both of which is made of a material which is suitable for injection moulding, said lid being sealable relative to the container; and wherein the lid comprises an elevated portion for abutment on the internal, upper edge of the container, wherein at least a portion of the lid (2) is made with a sealing zone (7, 8) for joining with the container (1), said sealing zone (7, 8) being added with an active material which, by influence during joining, changes the material in the sealing zone (7, 8) to the effect that the sealing becomes weaker than the surrounding material, whereby the scaling is, upon opening, broken in the joint and not in the surrounding material. The invention also relates to a method of sealing the above packaging, wherein a material is added which, during the sealing procedure, changes the material in the joint to the effect that the seal becomes weaker than the surrounding material, whereby, when opened, the seal is broken in the joint and not in the surrounding material.

16 Claims, 5 Drawing Sheets

(56) References Cited

U.S. PATENT DOCUMENTS

| | | |
|---|---|---|
| 2,887,244 A | 5/1959 | Betner |
| 3,048,299 A | 8/1962 | Hutchinson |
| 3,192,091 A | 6/1965 | Hev et al. |
| 4,387,551 A | 6/1983 | Cowan |
| 4,448,345 A | 5/1984 | Helms |
| 4,595,117 A | 6/1986 | Walter |
| 4,801,041 A | 1/1989 | Takata et al. |
| 4,913,307 A | 4/1990 | Takata et al. |
| 5,034,074 A | 7/1991 | Thomas |
| 6,170,696 B1 * | 1/2001 | Tucker et al. ............... 220/793 |
| 6,413,599 B1 * | 7/2002 | Petricca et al. ............. 428/35.7 |
| 7,549,540 B2 * | 6/2009 | Lee et al. ..................... 206/519 |
| 2002/0092852 A1 * | 7/2002 | Stewart et al. ............. 220/258.1 |
| 2004/0026438 A1 * | 2/2004 | Tyra et al. ..................... 220/660 |
| 2004/0144781 A1 * | 7/2004 | Dees et al. ................... 220/4.24 |

FOREIGN PATENT DOCUMENTS

| | | |
|---|---|---|
| EP | 0262652 | 4/1988 |
| EP | 0440550 | 8/1991 |
| GB | 2398267 | 8/2004 |
| WO | 0046118 | 8/2000 |

OTHER PUBLICATIONS

English Abstract of EP0440550.

* cited by examiner

PACKAGING WITH LID SEALABLE TO CONTAINER AND A METHOD OF SEALING THE PACKAGING

FIG. BACKGROUND OF THE INVENTION

1. Field of the Invention

The invention relates to a packaging including a container and a lid, both of which are made of a material which is suitable for injection moulding, the lid being sealable to the container, and wherein the lid includes an elevated portion for abutment on the upper edge of the container. The invention further relates to a method of sealing the packaging.

2. The Prior Art

Packagings are known wherein a lid can be sealed to a container. In particular, when the packaging is used as sales presentation packaging for foodstuffs, it is important to know whether such seal has been broken.

Therefore the seal serves several purposes. It may be for instance to ensure that the matter contained in the packaging does not fall or seep out; to ensure that the matter is not exposed to the influence of any harmful substances, which may, in the context of foodstuffs, be oxygen that initiates a putrefactive process; or it may be to enable the consumer to ascertain, in an easy and clear manner, whether the packaging has been opened, that is in order words to ensure that the product contained in the packaging has not been tampered with and is as fresh as possible.

The breaking of such seal may take place intentionally or unintentionally. Intentional breaking of the seal of a non-purchased item cannot be avoided by safety measures, but it can be made as obvious to the consumer as possible to see whether the seal on a commodity has been broken.

Unintentional breaking of the seal is not a deliberate act, but may in many cases be due to inexpedient configuration of the packaging.

It applies to many known packagings that the lid protrudes beyond the subjacent container, whereby, in scenarios where the packaging is stacked closely or is being transported, the seals come into close with each other in such a manner as to cause the seal to be broken unintentionally.

By packagings as such it is important that one is able to see what it contains, i.e what product is being sold. Therefore there is often some kind of label on the packaging. In order to avoid damaging the label during handling, the label is advantageously moulded integrally (In Mould Labelling, IML), rather than the label being subsequently attached by gluing.

SUMMARY OF THE INVENTION

The novel aspect of the invention is to provide a more convenient way of producing a packaging that provides safety against unauthorised opening and a simple and reliable renewed closing of the packaging following authorised opening.

By the invention, it is desirable to ensure:

that the packaging is not broken unintentionally;

that, upon opening, simple and well-functioning breaking of the seal of the packaging occurs;

that it appears clearly whether the packaging has been opened; that the packaging is easily closed again; and to ensure that the renewed closing is liquid-proof and hence exhibits considerably improved sealing properties compared to known and conventional dust covers.

According to the invention this is accomplished in that at least a part of the lid is provided with a sealing zone for being joined with the container, said sealing zone being provided with an active material which, upon influence during joining, changes the material in the sealing zone to the effect that the sealing becomes weaker than the material surrounding it.

Hereby, upon opening, it is the seal that is broken in the joint and not the surrounding material.

This is also accomplished by a method of sealing a packaging, wherein an active material added during the manufacture of the packaging is influenced during joining by application of heat and changes the material in the sealing zone to the effect that the seal becomes weaker than the surrounding material.

Hereby, upon opening, it is the seal that is broken in the joint and not the surrounding material.

Optionally, at least a part of the lid can be manufactured from or constituted by a material suitable for injection moulding and being at least arranged in connection with the lid in such a manner that the material delimits an area for sealing of the lid to a subjacent container. On the underside of the lid a flange may be formed that extends downwards relative to the normal position of the lid in such a manner that the flange abuts on the inner side and or outer side of the container when the lid is arranged on the container.

The flange may be provided with some kind of bead which is preferably arranged bottommost on the outer side of the flange. The most important function of the bead is to be able to mutually engage with a groove formed on the inner side of the container or in connection there with. This mutual engagement imparts to the lid the ability to be closed again and enables the lid to be secured in a stable manner in its closed position.

Thus, the lid can be manufactured from a material which is suitable for injection moulding. Thereby the lid is easy to manufacture. In order to enable sealing of the lid to the container, which is also made by injection moulding, it is important that such seal is tight. Hereby, it is accomplished that it is not necessary to have a membrane in the form of a foil or the like to seal against the intrusion of atmospheric air in view of the fact that the injection-moulded lid with the seal according to the invention provides such tightness.

However, it is also important that the seal can be broken by the consumer when the consumer needs to access the product contained in the sealed container. In this context, it is of particular importance that such breaking of the seal takes place in a controlled manner, whereby the breaking preferably takes place in or in immediate vicinity of the seal and not such that the material around the seal in either lid or container is destroyed.

This is accomplished by adding some kind of active matter to the material the lid and/or the container is made of. The active matter may be of such nature that it is added during the injection moulding and is subsequently activated when the packaging is sealed.

When that matter is activated, welding or joint by supplying heat or the like is made somewhat "poorer", meaning that it is ensured that, when the seal is broken, the breaking point will be in the joint and not in the surrounding material.

Preferably the packaging is made of crystalline plastics materials, and when the crystalline plastics material used for manufacturing the packaging solidifies during/following the moulding process, crystalline grains are formed. The active substance or material added to the moulding material prior to the moulding process to accomplish modified adhesion in the areas where the active substance is added is deposited in the peripheral areas of the crystalline grains. The desired function of the active substance depends on the crystalline grains being of sufficient size.

This is accomplished by using a moulding material without addition of nucleating agents. Thereby it is accomplished that the finished material consists of larger crystalline grains of the moulding material surrounded by larger areas of added active substance.

One exemplary suitable material for the manufacture of the packaging is polypropylene.

By adding an active substance that can be deposited as crystals along the peripheral areas of the grains in eg polypropylene, it is accomplished that polypropylene to which the active matter is added obtains an adhesion upon welding to the polypropylene to which the active substance is not added, which adhesion is poorer than it would have been if the active substance had not been added.

The adhesion can be regulated by means of the degree of addition of active substance to the polypropylene.

In order to ensure that this poorer adhesion occurs locally in places where such poorer adhesion is desired, it is an option, during the injection moulding process to add the active substance to those areas where such effect is desired.

It can be done by adding the active substance to a part of the packaging, eg to a lid or to a container, but conveniently it suffices to add the active substance to that area of one of the packaging parts which is used as sealing zone.

Poorer adhesion as used herein is to be understood as the materials being, during welding, caused to be joined to the effect that lid and container are secured against each other, but where a force of a certain magnitude still needs to be applied in order for the joint to release.

If two elements of polypropylene were joined by welding such force would be considerably larger and the material around the welding would be destroyed, with the result that renewed closure of the packaging would be inexpedient.

Lid and or container may be manufactured as multi-component elements, whereby the material as such to which an active substance or a combination of active substances is added need only be a part of the lid or the container or of both.

Thereby it is obtained that if it becomes expensive to manufacture either lid or container or both in said materials, the central parts of either lid or container or both parts can be manufactured in a less expensive material, and it is an option that only those parts of either lid or container or both parts that constitute the sealing zone are manufactured in the more expensive material, if that is the case.

A lid manufactured in this manner will be comparatively rigid and therefore it is relatively easy to apply a label or to print directly onto the lid.

The outer edge not extending beyond the edge of the container, it is accomplished that the packaging is not opened unintentionally since the risk of anything or anybody accidentally influencing the lid in such a manner that the seal is broken is minimised.

In order to be able to more readily seize around a finger flap for opening of the packaging, it is an option, in connection with the container, to provide an edge or an area of the container that can be removed in order to thereby provide access to the finger flap. Such edge or area can advantageously constitute or be a part of a so-called "tamperproofing device" or Tamper Evidence.

With regard to renewed closure of the packaging, the lid is provided with an internal or an external snap bead engaging with a groove, indentation, edge or bead formed internally and or externally in the container. Such groove, indentation, edge or bead preferably extends in the upper part of the container in proximity of the container opening.

The snap-bead is able to extend all the way around the inner edge of the container and or outer edge, or the bead can be divided into a number sections.

BRIEF DESCRIPTION OF THE DRAWINGS

Now the invention will be described in further detail with reference to the drawing, wherein FIG. 1 schematically shows a seal according to the invention, wherein the lid is configured with an edge added with an active substance; and which shows, on the lid, a snap locking for engagement with an internal edge or bead in the container.

DETAILED DESCRIPTION OF THE PREFERRED EMBODIMENTS

Figure 1:
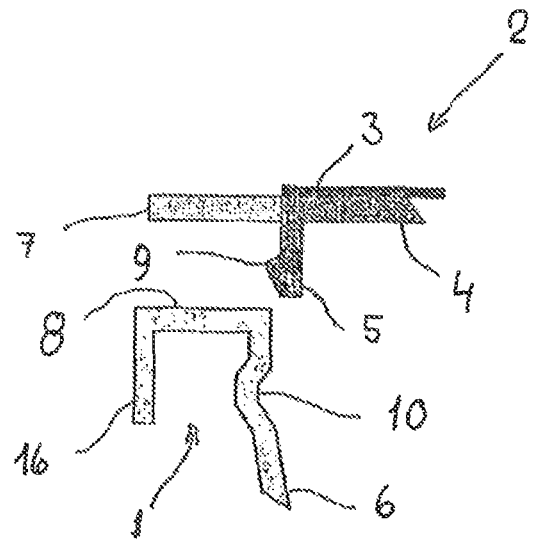

In the following, convenient embodiments of a packaging according to the invention are described, wherein a container 1 intended for containing especially foodstuffs is configured for being closable with a lid 2 in a sealing manner to the effect that, when foodstuffs are packed in the packaging, sealing of the packaging can be provided. Preferably, the lid 2 is configured with a label that may be moulded integrally in foil 3 or may be foil 3 constituting in itself a label. This foil 3 is arranged on an inner portion 4 which is preferably made of a more rigid and/or thicker material than the foil 3. The inner portion 4 is, along its rim, provided with a flange 5 that extends downwards relative to the normal position of the lid in such a manner that the flange 5 abuts on the inner side 6 of the container 1 when the lid 2 is arranged on the container 1. Along its rim, the lid is provided with an edge 7 intended for abutting on a corresponding face 8 on the container.

According to one embodiment of the lid for the packaging, the lid may be configured such that the entire inner portion 4 of the lid is made of the same material. According to a further embodiment the surface of the lid can be manufactured from a material that can be sealed to the container, to which top face the flange 5 can be secured to the effect that lid with flange can be caused to engage with the container for renewed closure of the packaging.

Such renewed closure is ensured by a protruding edge 9 on the flange 5, which protruding edge engages in a corresponding bead 10 configured on the internal side 6 of the container 1.

Moreover, in some cases the foil 3 may be expendable and a label can be applied to the inner portion 4 or it is an option to press or print a label directly onto the top face of the inner portion 4.

According to one embodiment of the packaging, the flange 5 and the inside 6 of the container 1 may, where the inside 6 faces towards the opening of the container 1, be provided with mutually engaging 9, 10 means for securing the lid 2 to the effect that it can easily be arranged and secured on the container 1 and simultaneously be removed again (the container is opened to provide access to its contents). In the context of the invention, it is important that it is very clear whether the container has been opened, thereby enabling the consumer to ascertain that, when taking a packaging with contents consisting of e.g., some foodstuff in a shop, it appears without a doubt whether the packaging has been opened or not. Thereby, the consumer is confident about the item contained in the packaging.

According to an alternative embodiment of the packaging, the flange 5 can be arranged along the edge of the lid and may engage with an edge or bead 16 formed in connection with the outside 17 of the container 1, where the outside 17 faces towards the opening of the container 1. The flange 5 and the edge 16 of the container can thus be provided with mutually engaging means 9, 16 for securing the lid 2 such that it can readily be arranged and secured on the container 1 and also be removed easily again (the container is opened to provide access to its contents).

The lid 2 can be manufactured with relatively few injection points, e.g., 2- 3-and may advantageously be moulded in one operation.

The lid 2 can be sealed against the container 1 via a hot welding applied onto/through the label 3, or the lid can be sealed against the container via a hot welding, ultrasound welding or some other kind of sealing applied onto/through the sealing zone.

According to a particular embodiment the lid 2 can be configured without integrally moulded label 3. The label 3 can also be pressed on printed directly onto the lid 2.

Along the edge 5 of the inner portion 4, a snap bead is formed which is taken completely or partially along the edge 5.

This contributes to providing improved sealing of the packaging when it is closed anew, which further contributes to increasing the longevity of its contents.

The external edge 7 provided in connection with the lid 2 stabilises the label 3 against curling at the edge when a presentable appearance is to be imparted to the packaging. Moreover the edge 7 also stabilises the label 3 during welding of the lid 2 onto the container 1 to the effect that the label 3 is entirely plane and can be welded in place in an easy and reliable way. Moreover the lid 2 is stabilised in such a manner that it is easy to handle during production and during transport.

Thus, the external edge 7 of the lid 2 can also be used as a kind of opening flap 11, where it is possible to pull the lid 2 from the container by entirely or completely rupturing the welding between container 1 and lid 2. The increased material thickness obtained by using the external edge 7 as opening flap 11 rather than, as previously known, using the thinner foil as opening flap to pull the lid 2 from the container 1, provides a far better grip around the opening flap 11 and ensures that the foil and hence the label 3 is not torn during opening of the packaging.

Figure 4:
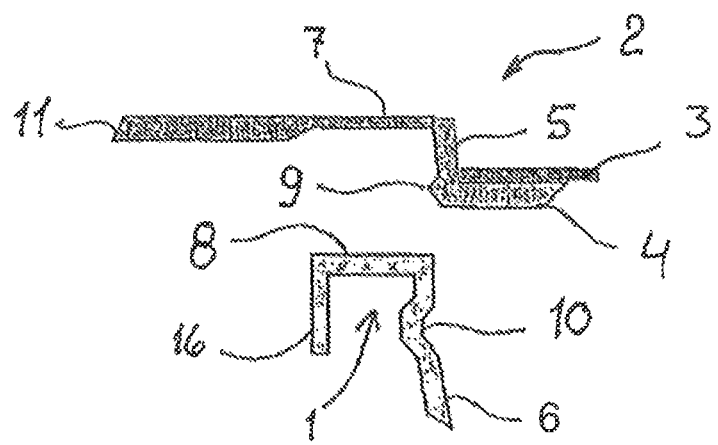
FIG. 4 schematically shows yet a seal according to the invention and indicates a snap locking for engagement with an internal edge or bead in the container and wherein, in connection with the sealing zone, a finger flap is provided.
Figure 5:
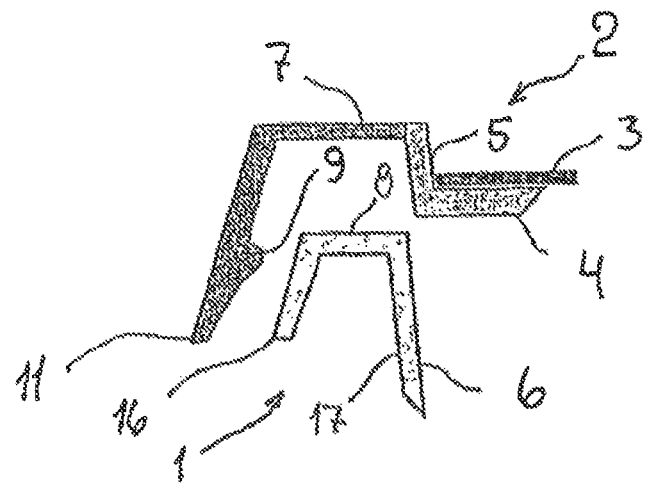
FIG. 5 schematically shows yet a seal according to the invention and indicates an external snap locking and wherein the external snap locking can be used as finger flap.
Figure 6:
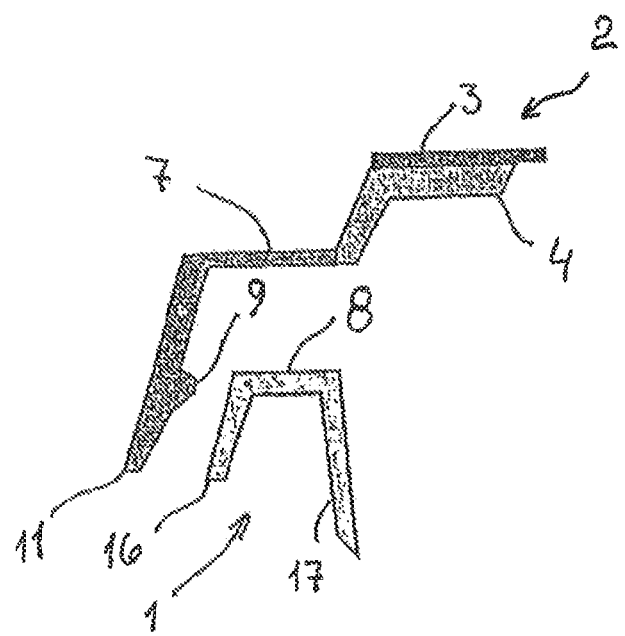
FIG. 6 schematically shows a further seal according to the invention with an external snap locking that can be used as finger flap and wherein the central part of the lid is elevated.

According to one embodiment as shown in FIGS. 4 and 5, where the external edge 7 is arranged to extend above the top face of the central part of the lid 2, the edge 7 contributes to improving the stacking properties when filled packages are concerned, the edge 7 contributing to ensure that the filled packagings do not topple and/or are offset when stacked atop each other.

The external edge 7 and hence a kind of full-moulded opening flap or finger flap 11 contributes further to safeguard the packaging to the effect that it appears clearly whether the packaging has been opened.

Thus, neither of the lid parts needs to extend beyond the parts of the container, meaning that the lid is protected against inexpedient opening.

According to a further embodiment the joint between container and lid may be configured such that an edge is formed along the underside of the label's circumference, said edge extending a distance towards the centre of the label. The edge and hence the lid are sealed against the container via a hot-welding or the like. The joint or the welding is configured with and/or by means of joining means suitable for the task.

Owing to the increased material thickness of the element through which the welding is to be performed, the seal becomes more robust and uniform compared to a scenario in which the welding is to take place through the foil. Therefore sealing may be performed without influencing the label.

According to a further embodiment the welding face may be constituted by an integrally moulded material, which material is selected such that desired properties are obtained in relation to, e.g., breaking strength, welding conditions, autoclaving, pasteurising, etc.

The label can be taken all the way to the edge, but this is not necessary as it was earlier.

Further advantages of said embodiments are that the label is not in direct contact with the sealing face; that there is no risk of the label being torn when the sealing is broken; and that the decoration on the label is not influenced by the welding process.

The material supports the construction which provides a homogeneous and stable design and an improved course of production and handling.

The material provides increased freedom of design, it being possible to expand the outer edge to a full-moulded gripping edge/finger flap which further provides improved grip and hence increased user-friendliness.

Figure 8:
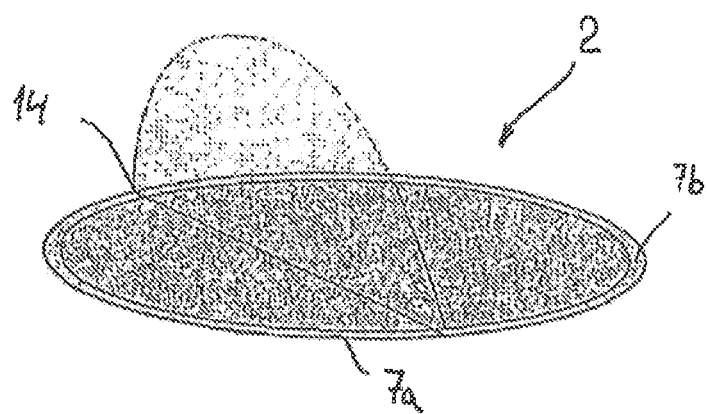
FIG. 8 shows an embodiment of a lid for the packaging wherein a part of the lid has, along its rim, poorer adhesion to the container than the remainder of the rim of the lid.
Figure 9:
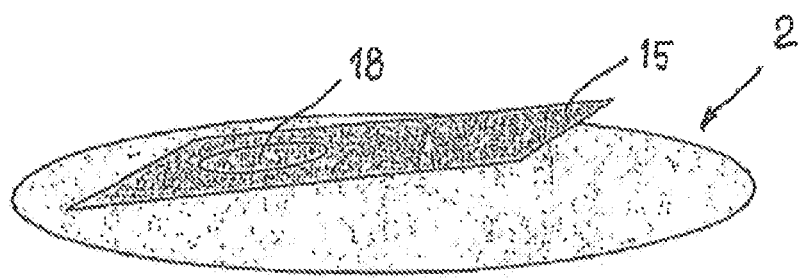
FIG. 9 schematically shows an embodiment of a lid, wherein, by means of invention, some kind of accessory is secured to the packaging.

As shown in FIG. 8 the lid 3 can further be provided with a functionality, the lid being hinged or divided into sections with some kind of weakening lines 14 or points to the effect that the lid can be opened while the remainder of the lid is still sealed to the container. Thereby a pouring function is accomplished while simultaneously it is easy to close the lid again. Here it is a further advantage that the lid and container may be provided with mutually engaging means for securing the lid. Hereby a lid is accomplished which is easy to open and close again, and at the same time a lid providing the option of a smaller opening in the form of a part of the lid which can be opened and closed again several times by means of the snap bead, without the functioning of the snap bead being deteriorated.

By this embodiment the technique according to the invention is used to impart differentiated adhesion to the sealing zone. Hereby it is possible to accomplish an adhesion at the welding across a part of the joint between lid and container which is good and an adhesion at the welding across a remaining portion of the joint between lid and container which is less good, meaning that it is easier to open. In this manner a lid is provided where a part of the lid can be used as opening with pouring function.

FIG. 1 shows a sealing where the sealing zone is arranged as an edge on the outside of the lid and wearing a label covering the upper part of the lid's inner portion. Here the sealing zone of the lid and inner portion need not be of the same material.

Figure 2:
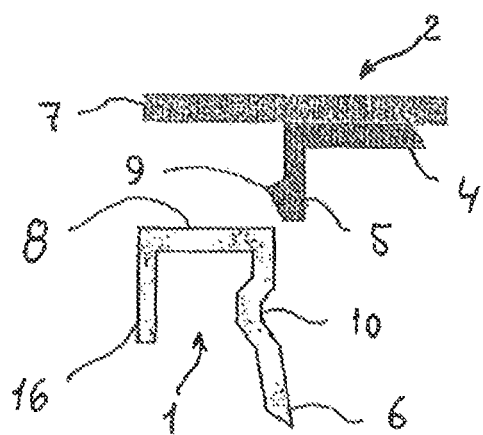
FIG. 2 schematically shows a second seal according to the invention, wherein an active substance is added to the top part of the lid.

FIG. 2 shows a sealing where the material constituting the sealing zone on the lid extends throughout the entire diameter of the lid. Here, the sealing zone and inner portion of the lid need not be of the same material.

According to a further embodiment the sealing zone and inner portion may be formed integrally and be of the same material.

Figure 3:
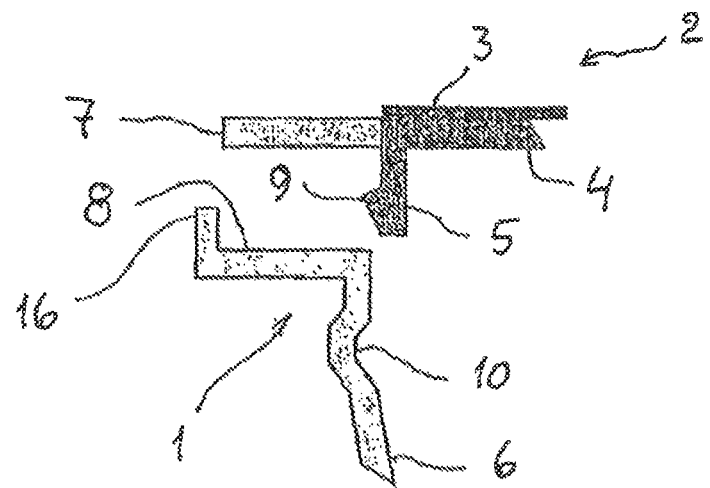
FIG. 3 schematically shows the seal shown in FIG. 1, but with an upwardly extending edge on the container.

FIG. 3 shows an embodiment of a seal according to the invention where the container is provided with an upwardly extending edge, wherein at least a part of this edge is as shown in FIG. 1 ; and wherein the outermost part of the edge 16 extends upwards to the effect that the upwardly folded edge constitutes a protecting edge relative to the lid. The upwardly extending edge may be configured to be broken off at least along a portion of the circumference whereby the portion that can be broken off is caused to constitute a kind of "Tamper Evidence".

In FIG. 3, the lid 2 as such is configured as shown in FIG. 1, but may be configured as any one of the embodiments of a lid and a container with internal snap-closure in connection with the seal according to the invention.

FIG. 8 shows that the lid 2 can be provided with a weakening line 14 or the like which makes it easier to bend the opening flap upwards for opening of the lid. It is also conceivable that a weakening line is provided that allows partial opening of the lid 2, while the remaining part of the lid 2 is secured by the seal or otherwise secured. Thereby it is possible to open a limited area of the lid instead of opening the whole lid which makes it easier to pour out a part of the container contents. On the whole, this can be used to advantage by providing the area used for opening the packaging with a joint or seal 7a between lid and container which is easier to break than the remainder of the joint or the seal 7b between lid and container.

Figure 7:
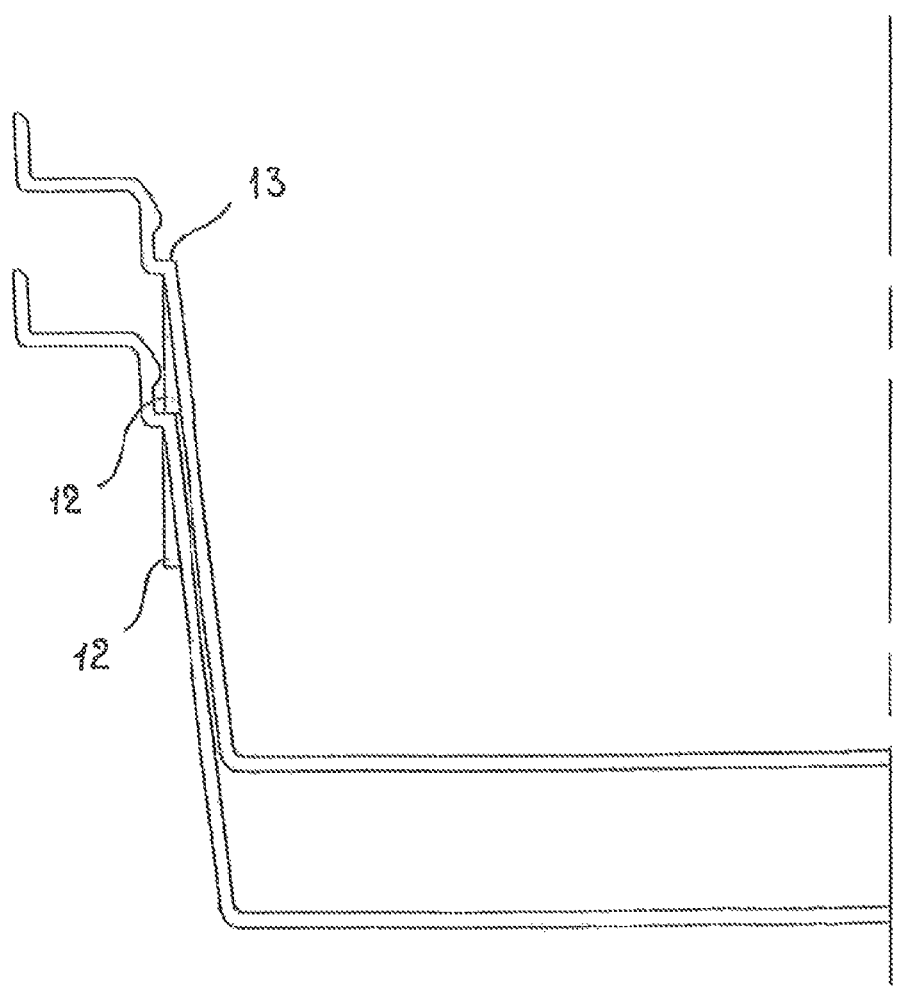
FIG. 7 is a schematic sectional view of an embodiment of the packaging which makes the packaging suitable for stacking.

As shown in FIG. 7, the external side of the container 2 can be provided with a number of protrusions 12 which—when a container 2 is stacked on top of (within) another container 2—the protrusion will step on an abutment 13 in the other container 2.

In the figures, different embodiments are shown in schematic views. The thickness of the lid relative to the sealing zone can thus not be deduced from the figures. The thickness of the sealing zone may be greater than the thickness on the remainder of the lid, or the thickness may be smaller than the remainder of the lid. Finally, the thickness of the material used in the sealing zone on either lid or container may vary along the cross-section of the sealing zone.

The modified adhesion properties in accordance with the invention can be executed on the edge 7 of the lid or on the face 8 of the container that constitute a sealing zone 7,8.

Finally the invention can be used to advantage for securing accessories 15 to the packing, such as stirrers, spoons, forks, knives or the like utensils that can be used in connection with the packaging.

This may be accomplished in that an area on the accessory 15 being, during the moulding process, added with an active material which, when influenced during joining by welding to the packaging, changes the material in a securing zone 18 to the effect that the adhesion in the zone 18 becomes weaker than the adhesion of the surrounding material.

The invention claimed is:

1. A packaging comprising a container and a lid, each of said container and lid being made of a crystalline plastics material which is suitable for injection moulding, said lid being sealable to the container via welding or joining by supplying heat, wherein the lid comprises an elevated area for abutment on an upper edge of the container, wherein at least a portion of the lid is made with a sealing zone for joining with the container, wherein at least a portion of the container is made with a sealing zone for joining with the lid, said crystalline plastic material of at least one of said lid and said container containing an active material which ensures that a seal formed between the sealing zones of the container and the lid via welding or joining by supplying heat is weaker than surrounding material, such that when the seal is broken, the breaking point will be in the seal and not in the surrounding material, the active material being added to moulding material of the sealing zone of at least one of said lid and said container prior to injection moulding and wherein said active material included in said sealing zone of at least one of said lid and said container is deposited in peripheral areas of crystalline grains formed in the moulding material during/following injection moulding.

2. The packaging according to claim 1, wherein the material of the sealing zone of the lid extends at least across a portion of the lid diameter.

3. The packaging according to claim 1, wherein an inner portion of the lid is made of the same material as the sealing zone of the lid.

4. The packaging according to claim 3, wherein the lid includes a flange made of the same material as the sealing zone of the lid.

5. The packaging according to claim 1, wherein the lid includes an integrally moulded label.

6. The packaging according to claim 1, wherein a thickness of the material used in the sealing zone on either the lid or the container varies along a cross-section of the sealing zone.

7. The packaging according to claim 4, including means on the flange for mutually engaging corresponding means in the container.

8. The packaging according to claim 1, including a protruding, upwardly oriented edge along an internal edge of the container at an opening thereof, said edge enclosing mutually engaging means of the lid and the container so that contents of container do not have ready access to the mutually engaging means.

9. The packaging according to claim 1, including protrusions on an external side of the container that constitute abutments against an edge or face configured therefor on an internal side of the container, whereby protrusions and edge or face constitute a stop for two containers that are stacked, and thus determine the intrusion of the one container into another.

10. The packaging according to claim 1, wherein the lid includes a weakening line that allows a partial opening of the lid, while a remaining part of the lid is secured to the container.

11. A method of sealing the packaging of claim 1, including the steps of injection moulding the lid, and adding an active material during the injection moulding and influencing the active material during joining with the container by application of heat to change the material in the sealing zone so that the effect that the sealing becomes weaker than the surrounding material.

12. The method according to claim 11, wherein the active material is, by a two-component moulding, added to a part of the material which is to constitute the sealing zone.

13. The method according to claim 11, wherein the active material along a portion of the area which is to constitute the sealing zone is added in larger amounts where a portion of the lid is to be openable and in smaller amounts where the lid is intended for still being secured by means of the seal.

14. The packaging according to claim 1, wherein said material of said container and said lid is polypropylene, and said active material is mixed with said polypropylene as crystals.

15. A packaging according to claim 1, wherein the active material is deposited as crystals along the peripheral areas of the grains.

16. A packaging comprising a container and a lid, each of said container and lid being at least partly made of a crystalline plastics material which is suitable for injection moulding, said lid being sealable to the container via welding or joining by supplying heat, wherein the lid comprises an elevated area for abutment on an upper edge of the container, wherein at least a portion of the lid is made for joining with the container, wherein at least a portion of the container is made for joining with the lid, said portions of said lid and said container being injection moulded of a crystalline plastics moulding material, wherein an active material is added to the moulding material of at least one of said portions of said lid and said container prior to or during injection moulding and wherein said active material contained in said portion of at least one of said lid and said container is deposited in peripheral areas of crystalline grains formed in the moulding material during or following injection moulding, such that a seal formed between the portions of the container and the lid via welding or joining by supplying heat is weaker than surrounding material, such that when the seal is broken, the breaking point will be in the seal and not in the surrounding material.

\* \* \* \* \*